United States Patent [19]
Ochsenbine

[11] Patent Number: 5,621,976
[45] Date of Patent: Apr. 22, 1997

[54] GRADE STAKE LINE CAP DEVICE

[76] Inventor: Thomas Ochsenbine, 73881 Colerain Rd., Dillonvale, Ohio 43917

[21] Appl. No.: 475,636

[22] Filed: Jun. 7, 1995

[51] Int. Cl.$^6$ ................................................. G01C 15/00
[52] U.S. Cl. ............................................ 33/339; 33/1 LE
[58] Field of Search .................... 33/1 G, 1 H, 1 LE, 33/228, 290, 293, 339, 755, 756, 757, 759, 404

[56] References Cited

U.S. PATENT DOCUMENTS

| | | | |
|---|---|---|---|
| 360,247 | 3/1887 | Reichenbach | 33/757 |
| 603,157 | 4/1898 | Spitzenberg | 33/756 |
| 1,466,563 | 8/1923 | Rutherford | 33/404 |
| 2,632,954 | 3/1953 | Lieberman | 33/339 |
| 2,872,733 | 2/1959 | Chew | 33/1 LE |
| 3,015,890 | 1/1962 | McCaskill | 33/339 |
| 3,250,009 | 5/1966 | Oseka | 33/404 |
| 4,057,903 | 11/1977 | Cantera | 33/339 |
| 4,231,156 | 11/1980 | Cooper | 33/1 LE |
| 5,173,004 | 12/1992 | Fahrenkrog | 33/1 LE |

*Primary Examiner*—G. Bradley Bennett
*Attorney, Agent, or Firm*—Lee A. Germain; Ray L. Weber

[57] ABSTRACT

A device having a top end and a bottom end is characterized by a longitudinal bore extending into the device from the bottom end a particular distance and adapted for receiving a contractor's grade stake therein, which bore is intercepted at its top end by a slot extending through the device from a one side to an opposite side thereof and configured to accept a contractor's grade line therethrough in a manner to maintain the line on the top surface of the grade stake within the bore such that a particular grade level as between at least two grade stakes which each carry a device on their top ends may be maintained via the line extending between them.

20 Claims, 2 Drawing Sheets

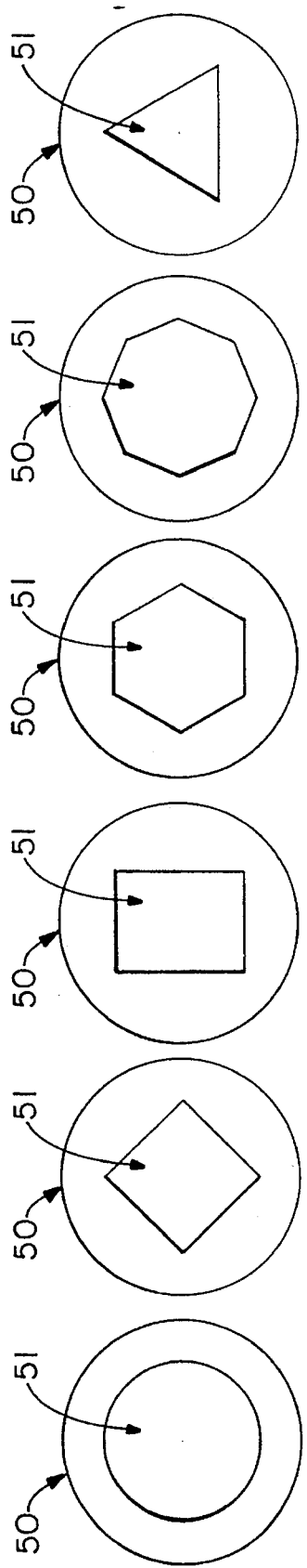
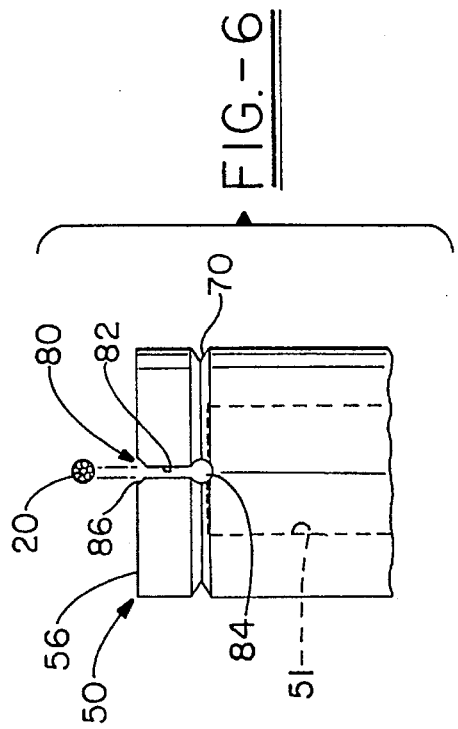

GRADE STAKE LINE CAP DEVICE

FIELD OF THE INVENTION

This invention generally pertains to the construction industry and, more particularly, to the various construction trades which must establish and maintain grade levels about a construction site to keep their work true and level.

Specifically, this invention provides a line cap device which is carried upon a contractor's grade stake to maintain a grade level as between at least two grade stakes by a passage of a contractor's line through each of said devices.

BACKGROUND OF THE INVENTION

In the construction industry, it is a necessary and required preliminary step to establish grade levels about a construction site. A surveyor using conventional surveying equipment surveys the site and grade stakes are driven into the ground which establish various grade levels about the site. Various individual contractors such as, for example, a concrete contractor will also have to establish lines and grades to aid in keeping the concrete work true and level. Conventionally, a concrete contractor will establish grade stake levels at the corners of, for example, building foundation footers and then stretch a line between the grade stakes where it may be secured. The line aids in driving additional grade stakes into the soil at a desired level to insure that the lineal length of a footer is level and true throughout its length.

As often times happens about a construction site where other contractors and/or workers are moving about the site in attempts to accomplish their own tasks, grade lines may be accidentally broken or removed from grade establishing stakes thus eliminating a grade level indicator needed by a contractor.

There is, therefore, a need in this art for a device which will easily enable a contractor to re-establish line grade levels between grade stakes when the need arises.

It is in accordance with one aspect of the present invention an object to provide a simple device which is carried by a grade stake and which accepts passage of a contractor's line therethrough in a manner such that line grade between grade stakes may be readily accomplished.

In accordance with another aspect of the invention it is an object to provide a device which establishes an accurate relationship as between the device carrying a grade level line through it and a grade stake upon which the device is mounted to maintain a specific grade level.

According to still another aspect of the invention it is an object to provide a grade stake line cap device through which a grade line may be passed or terminated which device is economical to manufacture in large numbers such that any loss thereof at a construction site will not create a hardship on those employing the device in their work.

In accordance with another aspect of the invention it is an object to provide a device for maintaining grade level at a construction site, which device may be made from various known materials and at the lowest possible price.

In accordance with another aspect of the invention it is an object to provide a line cap device usable by a contractor at a building site to maintain grade levels about the site, the device being carried at the top end of a grade stake to maintain a grade level as between at least two grade stakes each of which carries a said device, said device of such simple design and operation as to be usable by anyone working at a construction site.

SUMMARY OF THE INVENTION

The various objects, features, and advantages of the present invention may be achieved in a device comprised of a substantially rigid body having a longitudinal bore extending into the body from a bottom end and exhibiting a diameter which is capable of receiving multiple configurations of contractor grade stakes therein, the device body having a slot extending across the top end from a one side to an opposite side thereof and penetrating downwardly into the body to a depth extent which intercepts the longitudinal bore and configured to accept a contractor's grade line in a manner that the line is forced to rest upon the top end surface of a grade stake carried within the bore, said line maintaining a particular grade level as between at least two grade stakes each of which carries a device upon their top ends and a contractor's grade line between them.

BRIEF DESCRIPTION OF THE DRAWINGS

The various features and advantages of the present invention will be better understood and appreciated from a consideration of the following detailed description when taken in conjunction with the accompanying drawings in the several figures in which like-reference numerals indicate like elements and in which:

FIGS. 5A–5F are bottom plan views illustrating various bore configurations which may be applied to the device comprising the invention; and FIG. 6 is a partial elevational view illustrating an alternative embodiment of the invention.

DETAILED DESCRIPTION OF THE INVENTION

Figure 1:
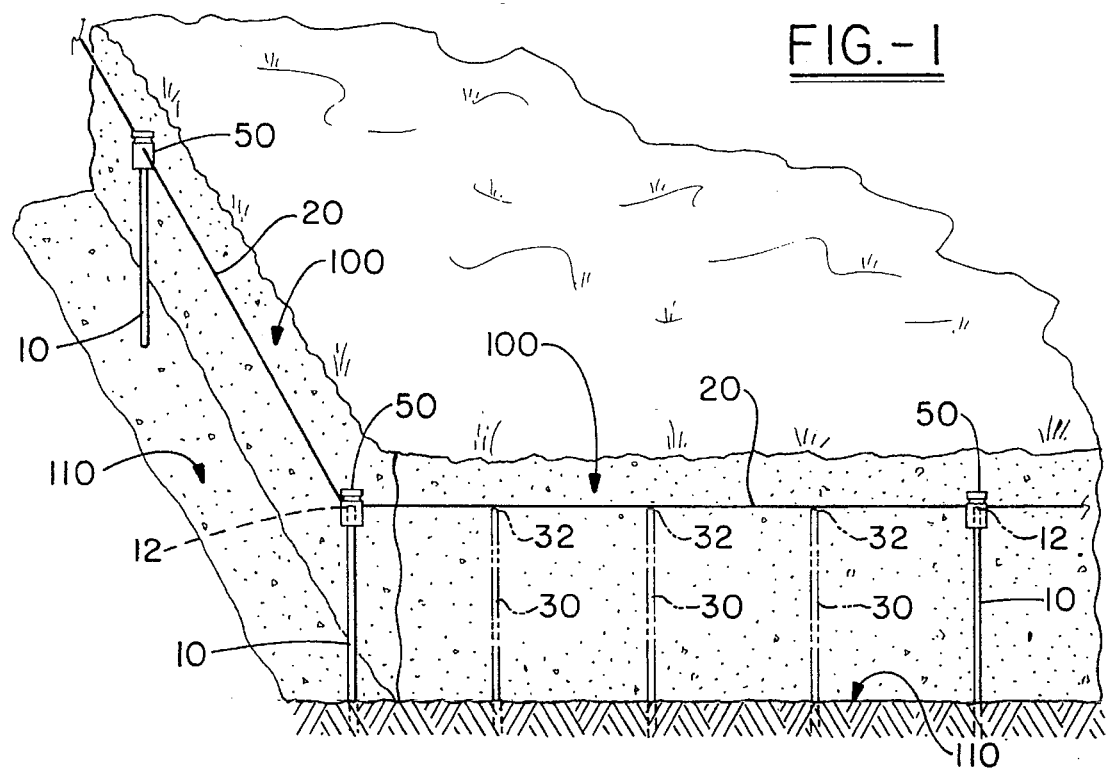
FIG. 1 pictorially illustrates the application of the invention to the establishment and maintenance of grade levels about a construction site.

Referring to the drawings, FIG. 1 illustrates the application of the invention to the establishment and maintenance of site grade levels at a particular construction. In the figure, a concrete footer for a building construction is to be poured into a trench 100 and, to insure levelness of the footer concrete, a plurality of grade stakes 10 are driven into the trench bottom 110 such that their top ends 12 are at the exact grade level desired. Conventionally, a contractor achieves this by using well-known surveying equipment and techniques. A contractor's line 20, which may also be called a "chalkline" in the trade, is tied or otherwise stretched between grade stakes 10 to establish a grade level between the stakes. In this way, a plurality of additional stakes 30 may also be driven into the trench bottom 110 to a depth such that their top ends 32 meet the level indicated by the line 20. Thus, it can be appreciated that all of the stakes 10 and 30 have their top ends 12 and 32 respectively at the same grade level.

Figure 2:
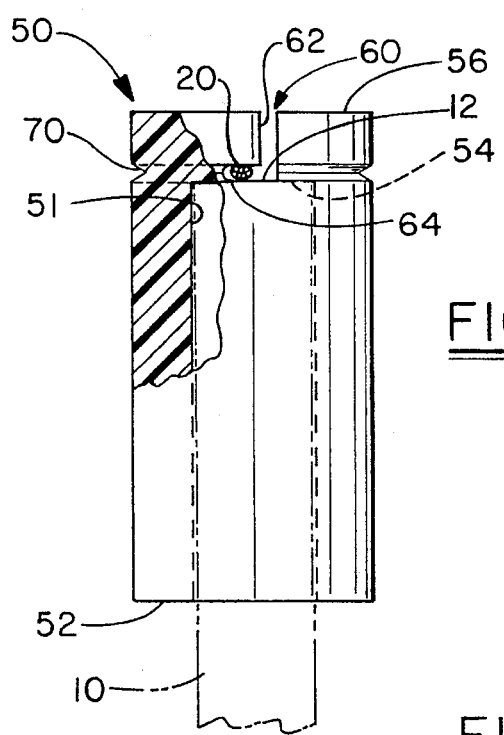
FIG. 2 is an elevational view, partially broken away and in cross-section, of a grade stake line cap device in accordance with the invention.
Figure 3:
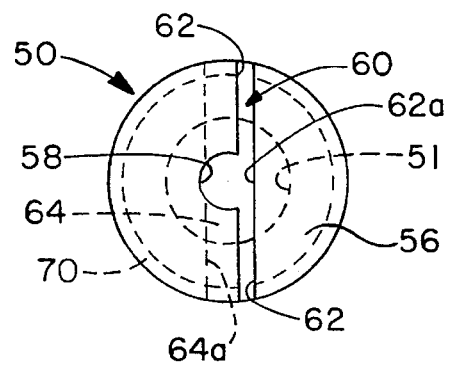
FIG. 3 is a top plan view of the device shown in FIG. 2.

In accordance with this invention, line cap devices 50 are mounted to the top end 12 of each grade stake 10 and these are adapted for receiving and passing the line 20 between them as illustrated. Referring now also to FIGS. 2 and 3 of the drawings, a line cap device 50 is characterized by a body having a central longitudinal bore 51 which extends into the body from a bottom end 52 to a top point 54 which is below the top end 56 of the body. The bore 51 is designed for a mating engagement with the top end of a grade stake 10.

While the bore 51 is illustrated as being circular in FIG. 3, it is anticipated that it may be of any geometric shape and still meet the needs of the invention. For example and as illustrated in FIGS. 5A–5F, the bore 51 may be circular, square, rectangular, hexogonal, octogonal, triangular, or any other multi-sided configuration known in the arts. In addition a bore 51 may be circular and of such diameter as to accept any configuration of grade stake 10 within it. Further, the bore 51 may be multi-faceted such that it may recieve any of the geometric shapes recited above within it when a grade stake exhibits such geometric shape. It is also anticipated that the outside contour of the device 50 may be of any of the recited configurations. The exact shapes of either the bore 51 or the outside surface of the device 50 may be a consideration in the manufacture of the device and/or its cost. To this end, therefore, a preferable bore shape 51 will exhibit a substantially universal shape such that it will accept most configurations of contractor's grade stakes 10. The exact shape of the bore 51 and/or the outer surface of the device 50 is, therefore, not considered to be a limiting factor in the invention.

Continuing with reference to FIGS. 2 and 3, the top end 56 of the line cap device 50 may also be characterized by a small diameter bore 58 which penetrates into the body so as to intercept the larger bore 51. This smaller bore 58 facilitates passage of air or debris out of the body but it may not be necessary and this will be appreciated from the following discussion and description.

A line cap device 50 is also characterized by a slot 60 which extends across the top end from one side to an opposite side and which penetrates into the body a depth to intercept the bore 51. The slot 60 has a vertical leg portion 62 intercepted by a horizontal leg portion 64. The vertical leg portion 62 is located so that an outside wall 62a is tangent to the small bore 58 while the horizontal leg portion 64 has an outside wall 64a that is tangent to an opposite side of the bore 58. That is to say, an outer wall 62a of the vertical leg 62 is parallel to an outer wall 64a of the horizontal leg 64 and this is clearly evident in the showing of FIG. 3.

The slot 60 exhibits a widthwise extent such that the diameter of a contractor's line 20 to be received within the slot fits snuggly within the slot. As illustrated in FIG. 2 of the drawing, a line 20 may be moved into the horizontal leg portion 64 and it may be positioned across the centerline of the device 50. From the showing of FIG. 2 it can be appreciated that, because of the relationship as between the horizontal leg portion 64 and the top end 54 of the bore 51, a contractor's line 20 passing through the slot 60 will lie directly on the top end surface of a grade stake 10 seated within the bore 51. Thus, a contractor's line 20 that is maintained within the horizontal leg portion 64 of slot 60 will always be at the grade stake level as set by the top end of a grade stake 10.

Figure 4:
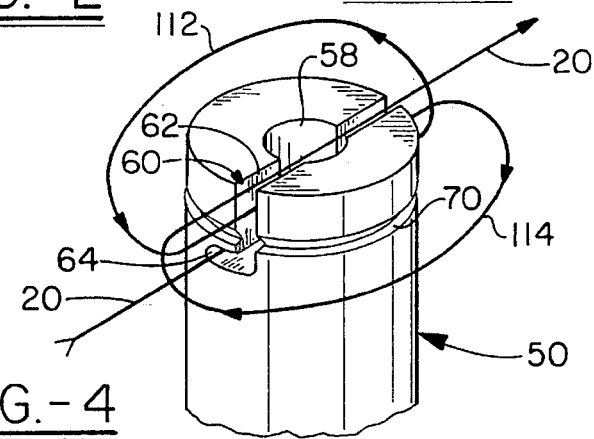
FIG. 4 is a perspective view of a line cap device illustrating a manner of grade line termination at a grade stake carrying the device.

Referring now also to FIG. 4 of the drawings, a line cap device 50 is illustrated to show the manner of terminating a line at a cap device 50. According to FIG. 4, a line 20 is drawn through the slot 60 as the line 20 may come from another grade stake 10 and line cap device 50 positioned to the left of the one illustrated. The line 20 is pulled taut through the slot 60 and wrapped around the body of the device 50 in a first direction as indicated by the arrow motion 112 to the left around the device. The line 20 is then passed through the slot 60 in the same direction as the first pass and it is then wrapped around the body in a second direction as indicated by the arrow motion 114 to the right. The line 20 is then passed through the slot 60 in the same direction as the first and second passes and it is pulled taut to tighten it down onto the outer surface of the body. It will be recognized that the line 20 defines a figure eight configuration about the body and this tends to eliminate any slippage of it on the body when tension is placed on the line.

Referring to FIGS. 2 and 4, the device 50 may also be characterized by an annular groove 70 which extends about the outer surface of the device body. The groove 70 is shown as being of a tapered configuration and this functions to maintain the line 20 within the groove. It will also help to eliminate any slippage of the line as it may be tightened down into the groove when tension is placed on the line 20. The groove 70 is shown as being in-line with the horizontal leg 64 of the slot 60 in FIG. 2 of the drawing. The groove 70, however, may also be located at a level below the horizontal leg 64 and, in either location, it can be seen that when the line 20 passes through the slot 60 it tends to be forced down into the slot so as to bear down onto the top surface of a grade stake carried within the longitudinal bore 51 of the device 50.

Additionally, the groove 70 may be located at a level above the horizontal leg portion 64 of the slot 60 as shown in FIG. 4. In this respect, the showing of FIG. 4 is primarily for the purpose of illustrating a manner of line termination at a line cap device 50 and the groove location is done to merely simplify the drawing and not to suggest a preferred location of it. The exact location of a line groove 70, therefore, is not considered to be limiting of the invention suffice to say that such groove may be provided to facilitate seating of a contractor's grade line 20 therein when tying off a line at a line cap device 50.

Referring now to FIG. 6 of the drawings, an alternative embodiment of the invention is illustrated wherein a line cap device 50 is characterized by a slot 80 which has a widthwise dimension that is less than the diameter of a contractor's line 20 as illustrated in the figure. The slot 80 has a first portion 82 which penetrates into the top end 56 a depth to intercept a second portion 84 which exhibits a circular cross-section. The second portion 84 comprises a transverse bore having a diameter that is substantially equal to that of a contractor's line 20 such that the line may easily slide through the bore. The second portion 84 is at a depth such to intercept the central longitudinal bore 51 of the device 50. A contractor's line 20 within the bore 84 is in contacting engagement with a top end of a grade stake 10 carried within the bore 51. To accomplish this, the slot 80 is located such that it extends from a one side of the device 50 to an opposite side thereof passing through a central longitudinal axis of the device.

From the above description of FIG. 6, it can be appreciated that a plurality of devices 50 may be carried on a contractor's grade line as a group and used in sequence as the line is payed out between a plurality of site grade stakes 10. If additional devices 50 are required these may be merely added to the line via the slot 80 and they cannot easily fall off of the line due to the restriction of the slot portion 82. In this respect also and to facilitate line passage into the slot 80, the top end of the slot portion 82 may be chamferred as illustrated at 86. This will aid in aligning the grade line 20 with the lengthwise extent of the slot. Of course it will be recognized that the slot 60 of the line cap device illustrated in FIG. 2 of the drawings may also exhibit a widthwise dimension that is less than the diameter of a contractor's grade line 20. Such slot 60 may also have the top end of the portion 62 chamferred to ease alignment of a line with the slot.

The material which may comprise a line cap device 50 is illustrated at the broken-away cross-sectional portion of FIG. 2 as being a plastic material. It is anticipated that line cap devices 50 may be manufactured in large quantities and at a low cost when made of any well-known plastic using conventional plastics manufacturing processes. This is not to say, however, that the devices 50 cannot be made of a suitable metal or metal alloy or of any suitable wood product. The material composition of a line cap device 50, therefore, is open to considerations of cost, ease of manufacture and/or any other economic considerations. These do not limit the scope of the present invention.

While certain representative features and details of the invention have been shown and described for the purpose of illustrating the invention, it will be apparent to those skilled in the art that various changes and/or modifications may be made thereto without departing from the spirit or scope of the invention.

What is claimed is:

1. A device for use by a construction contractor which may be carried on the top end of a grade stake to maintain a site grade level as between at least two grade stakes when each stake carries a said device and a contractor's line extends between them, the device comprising:

a substantially solid body forming a cap as defined by a top end and bottom end and longitudinal side walls interconnecting the top and bottom ends wherein the bottom end has an opening into a bore which penetrates longitudinally into the body a specific distance and is adapted for receiving a contractor's grade stake therein and the top end of the body has a slot which extends from a position on one longitudinal side wall of the body to a position on an opposite longitudinal side wall thereof and penetrates into the body to a depth such as to intercept the longitudinal bore, said slot exhibiting a configuration at the depthwise extent thereof such as to accept and maintain a contractor's line within the slot and on a top surface of a grade stake carried within the bore of the device.

2. The device as claimed in claim 1 wherein the slot comprises a vertical portion which extends into the body to a depth which intercepts the longitudinal bore and a horizontal portion which functions to hold a contractor's line in position on the top surface of a grade stake carried within the longitudinal bore.

3. The device as claimed in claim 1 wherein the top end has an opening into a small diameter bore which penetrates into the body to a depth which intercepts the longitudinal bore.

4. The device as claimed in claim 1 wherein the top end has an opening into a small diameter bore which penetrates into the body to a depth which intercepts the longitudinal bore and the vertical portion of the slot is substantially tangent to the small diameter bore for its depthwise extent and the horizontal portion is also tangent to the small diameter bore such that each portion of the slot has an outer wall which is parallel to the other.

5. The device as claimed in claim 1 wherein the body is also characterized by an annular groove extending about the outer surface of the body, said groove functioning to hold and maintain a contractor's line within it when the line is wound about the body.

6. The device as claimed in claim 5 wherein the line is terminated on the device body by passing it through the slot in a figure eight pattern and tightened down into the annular groove.

7. The device as claimed in claim 1 wherein the transverse cross-sectional shape of the longitudinal bore is such as to readily accept a grade stake exhibiting a like transverse cross-sectional shape.

8. The device as claimed in claim 1 wherein the transverse cross-sectional shape of the longitudinal bore is such that it accepts a grade stake exhibiting any transverse cross-sectional geometric shape including circular, square, rectangular, triangular, hexagonal, and any other multi-sided shape.

9. The device as claimed in claim 1 wherein the body comprises a rigid plastic material.

10. The device as claimed in claim 1 wherein the body comprises a metal or metal alloy.

11. The device as claimed in claim 1 wherein the body comprises a wood product.

12. The device as claimed in claim 1 wherein the slot comprises a vertical portion which has a widthwise extent that is less than the diameter of a contractor's line and a second portion exhibiting a circular cross-section that substantially matches the diameter of a contractor's line and which intercepts the first vertical portion and the longitudinal bore within the body such that a line passing through the second portion is in contacting engagement with a top surface of a grade stake carried within the longitudinal bore of the device.

13. The device as claimed in claim 12 wherein the slot is chamferred at the top end of the vertical portion.

14. Apparatus for use by a contractor to maintain site grade levels about a construction site comprises in combination:

at least two grade stakes in space-apart positions set into the ground a specific grade level;

a cap device carried upon the top end of each said grade stake comprised of a substantially solid body having a top end and a bottom end interconnected by longitudinally extending side walls wherein the bottom end has an opening into a longitudinal bore as defined by the side walls which penetrates into the body a specific distance and into which the grade stake is in a seated engagement therewith and the top end has a slot which extends from a position on a one side wall of the body to a position on an opposite side wall thereof and penetrates into the body a depth such as to intercept the longitudinal bore; and a contractor's grade line extending between the at least two grade stakes and passing into the slot of each said device to a depth of penetration of each slot such that the line rests on the top end of each grade stake carried within the bores of each of said devices to maintain the specific site grade level as between the two grade stakes for the lineal length of the line.

15. The apparatus as claimed in claim 14 wherein the depthwise extent of the slot is characterized by a horizontal portion which maintains the line in contacting engagement with the top end of the grade stake.

16. The apparatus as claimed in claim 14 wherein the slot is characterized by a first portion having a width for its depthwise extent that is less than the diameter dimension of a contractor's grade line and a second portion having a circular section exhibiting a diameter substantially equal to a contractor's grade line, said second portion passing from a one side of the device body to an opposite side thereof through a central longitudinal axis of the body such that the contractor's grade line is in contacting engagement with the top end of a grade stake carried within the longitudinal bore of the device.

17. The apparatus as claimed in claim 14 wherein the transverse sectional shape of the grade stakes and the longitudinal bores in the devices are similar.

18. The apparatus as claimed in claim 14 wherein the longitudinal bores of the devices exhibit a circular transverse cross-sectional shape and the grade stakes exhibit any conventional transverse cross-sectional shape which fits into a device bore.

19. The apparatus as claimed in claim 14 wherein the device comprises a substantially solid material taken from the group including a metal, a metal alloy, a plastic, and a wood product.

20. The apparatus as claimed in claim 14 wherein the slot has a chamferred entry at the top end.

* * * * *